United States Patent [19]

Cohn

[11] Patent Number: 4,479,146
[45] Date of Patent: Oct. 23, 1984

[54] VERTICAL CODE VERIFIER

[75] Inventor: Steven J. Cohn, Manhattan Beach, Calif.

[73] Assignee: Discovision Associates, Costa Mesa, Calif.

[21] Appl. No.: 355,944

[22] Filed: Mar. 8, 1982

[51] Int. Cl.³ ............................................. H04N 9/62
[52] U.S. Cl. ..................................... 358/147; 358/10; 358/139; 358/142
[58] Field of Search ...................... 358/10, 12, 13, 139, 358/142, 147, 145, 146, 319; 360/31

[56] References Cited

U.S. PATENT DOCUMENTS

| 4,124,209 | 7/1979 | Hedlund | 358/342 |
| 4,240,100 | 12/1980 | Gorbold | 358/139 |
| 4,276,564 | 6/1981 | Watson | 358/139 |
| 4,358,787 | 11/1982 | Oprandi | 358/147 |
| 4,394,687 | 7/1983 | Hutt | 358/147 |

Primary Examiner—Michael A. Masinick
Attorney, Agent, or Firm—Ronald J. Clark

[57] ABSTRACT

Apparatus for verifying the accuracy of insertion of code signals in the vertical intervals of video signals. The code signals are inserted in accordance with a procedure characteristic of a specified encoding format. The accuracy of insertion is verified by testing the codes against a predetermined set of conditions related to the procedure. Failure to meet one of the conditions results in the generation of an error signal.

13 Claims, 14 Drawing Figures

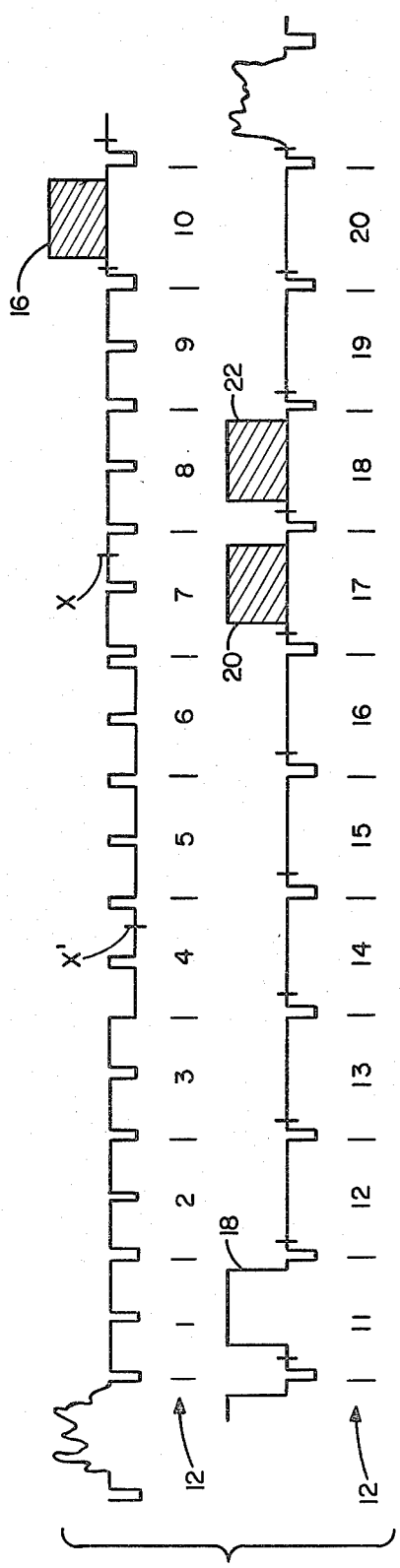
FIG. IA
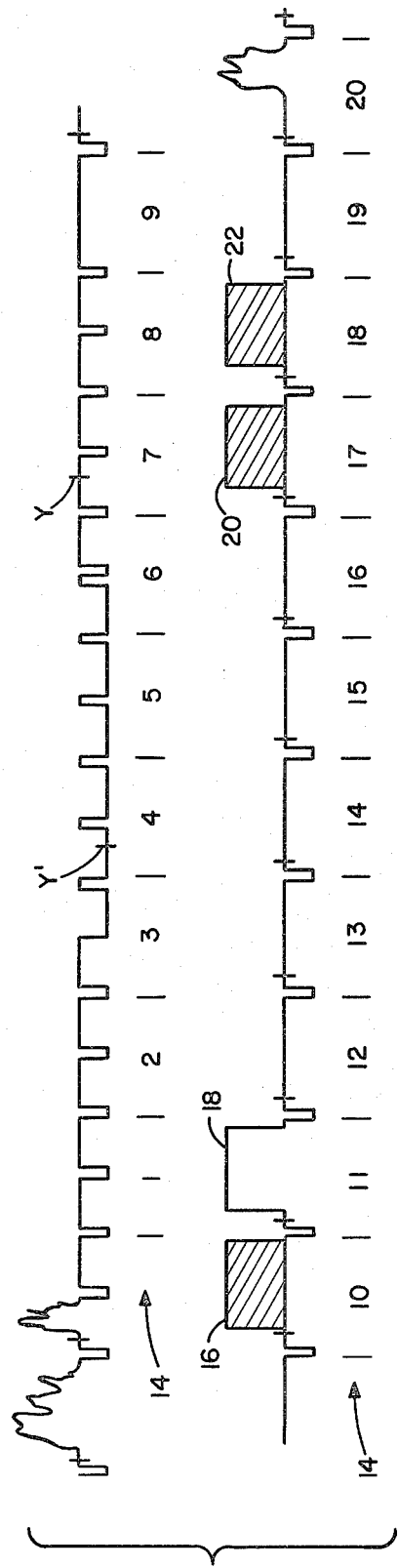
FIG. IB

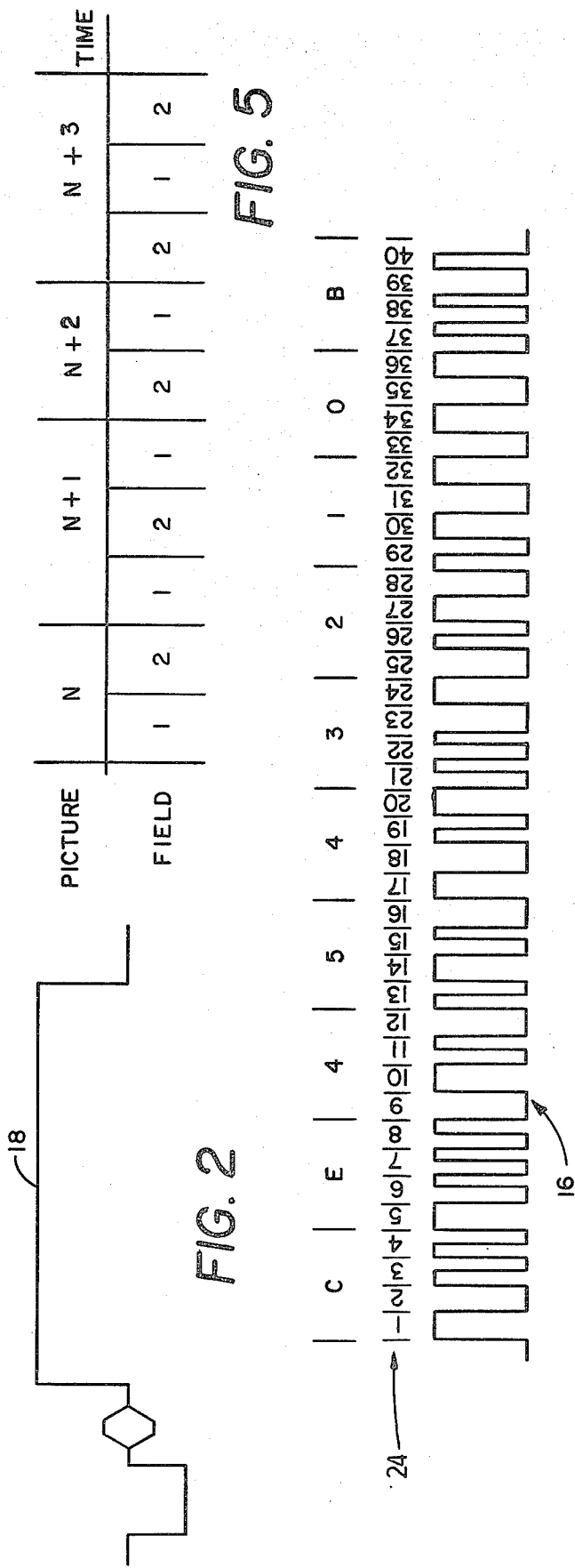

VERTICAL CODE VERIFIER

BACKGROUND OF THE INVENTION

1. Field of the Invention

The present invention relates to the field of code verification, and more particularly relates to apparatus for verifying the accuracy of codes inserted in the vertical intervals of video signals.

2. Background Art

The optical video disc is a relativly recent technological development which provides expanded flexibility in the programming and playback of video program material, as compared with magnetic tape. This flexibility is typically implemented through the use of special codes which are inserted in the vertical intervals of the video signals which are recorded on the disc.

For example, constant angular velocity ("CAV") video discs have particular versatility by virtue of the fact that the vertical intervals of the fields of video recorded on the disc line up in discrete radial directions. The most typical CAV format provides two fields of video in each spiral track, such that the vertical intervals of Field 1 of all frames line up in one radial direction and those of Field 2 in a second radial direction 180° opposite the first direction. The CAV disc is played by rotating the disc at a constant angular velocity and translating an imaged beam of light across the disc to follow the spiral pattern of the tracks of video information on the disc.

Because of the symmetrical arrangement of recorded video on CAV discs, special effects, such as slow motion and stop motion playback, are rendered relatively easy to implement as compared with other video recording and playback media, such as tape. For example, stop motion playback of a particular frame of video is effected by rotating the disc at its normal rate of rotation, scanning the imaged beam of light along the single track containing the signals for the frame being played, and causing the light beam to jump back to the beginning of that track once every rotation of the disc. Due to the symmetrical arrangement of the video fields recorded on the disc, horizontal and vertical synchronization are maintained smoothly during such stop motion playback mode without the need of special resynchronization circuitry.

Searching for specific frames of video can be effected quite rapidly with video discs, whether they are of the CAV type or of the constant linear velocity ("CLV") type which are played at a rotation rate which maintains a constant linear velocity of the reading spot of laser light with respect to the track being read. For example, if the spot of laser light is to be moved from the beginning of the program material on a disc in a search for a frame relatively near the end of the program material, the spot is merely moved radially to the vicinity of the frame being searched and then tracks are selectively scanned according to an algorithm which rapidly locates the frame being searched. Sweeping a spot of laser light across an optical disc can be done far more rapidly than advancing conventional video tape through such a span of program material, hence the particular usefulness of the optical video disc in such a mode.

In order to permit the implementation of these special playback modes it has been found desireable to insert special codes during the vertical blanking interval of the program video which is recorded on the disc. These special codes serve to identify those frames where jumpback in a special mode, such as stop motion, is permissible to provide a jitter-free frame of displayed video in that mode, and serve to identify frames and other selected subdivisions of the program material for these special modes.

The special codes are inserted into the video in accordance with a procedure which represents a set of rules related to the structure of the video content of the signals, for example, to the pattern of repetition of identical fields of video.

The accurate placement of these coded signals in accordance with the aforementioned procedure is important to ensure that the desired special playback mode capability is fully provided for an entire segment of such video. However, there have heretofore been no apparatus which automatically determine if the specially coded signals have been thus accurately placed on a given segment of recorded video. Checking an entire segment of such video, for example a one or two hour segment of video, has therefore been done by manual inspection on a field-by-field basis of the segment of video using video signal monitoring equipment. Such a practice is time consuming and costly.

Accordingly, there is a need for an apparatus which permits the automatic inspection of the video signal content of a recorded segment of program video having the aforementioned special codes inserted therein, to determine if those codes have been properly inserted. The present invention satisfies this need.

SUMMARY OF THE INVENTION

The present invention resides in apparatus for verifying the proper placement of a plurality of code signals placed in vertical intervals of a segment of video recorded on a recording medium according to a predetermined procedure for code signal insertion.

The segment of video is provided to the apparatus and the code signals are recovered from that video signal. A special testing element tests the recovered code signals to determine if those code signals conform to a predetermined set of conditions related to the procedure. Error signals are generated in response to detected nonconformance of the code signals by the testing element.

The present invention is particularly suited for the testing of segments of program video which have the aforementioned special code signals inserted in the vertical intervals thereof, and which have been recorded on magnetic tape. Typically, in the disc mastering process which leads to the mass production of optical video discs, the program video signals to be recorded on the disc are initially recorded on a high quality video-magnetic tape. The video signals are then transferred from the tape to the disc in a process by which the video disc signal tracks are actually generated. Once signals have been recorded on an optical video disc, they cannot be erased to allow for re-recording on the disc. However, corrections can be made to signals recorded on tape. Consequently, the present invention finds its most useful and effective application in connection with the testing of the video signals recorded on the magnetic tape from which the video signals are recorded onto a video disc.

The present invention is especially suited for testing the vertical blanking interval codes used in connection with the special playback mode functions described above. Accordingly, it will be appreciated that the present invention represents a significant advance in the field of video signal testing generally, and particularly to the field of test apparatus for video signals generated in connection with optical video discs.

Other aspects and advantages of the present invention will become apparent from the following description of the preferred embodiment, taken in conjunction with the accompanying drawings, which disclose by way of example, the principles of the invention.

BRIEF DESCRIPTION OF THE DRAWINGS

FIGS. 1A and 1B are signal level diagrams of the vertical blanking intervals of Field 1 and Field 2 of video.

FIG. 2 is a signal level diagram of a "white flag" code signal.

FIG. 3 is a signal level diagram of a word of FM data.

FIG. 4 is a signal level diagram of a word of biphase data.

FIG. 5 is a diagram showing the relationship between picture and fields in a "3/2 pulldown" process.

DETAILED DESCRIPTION OF THE PREFERRED EMBODIMENT

Figure 6:
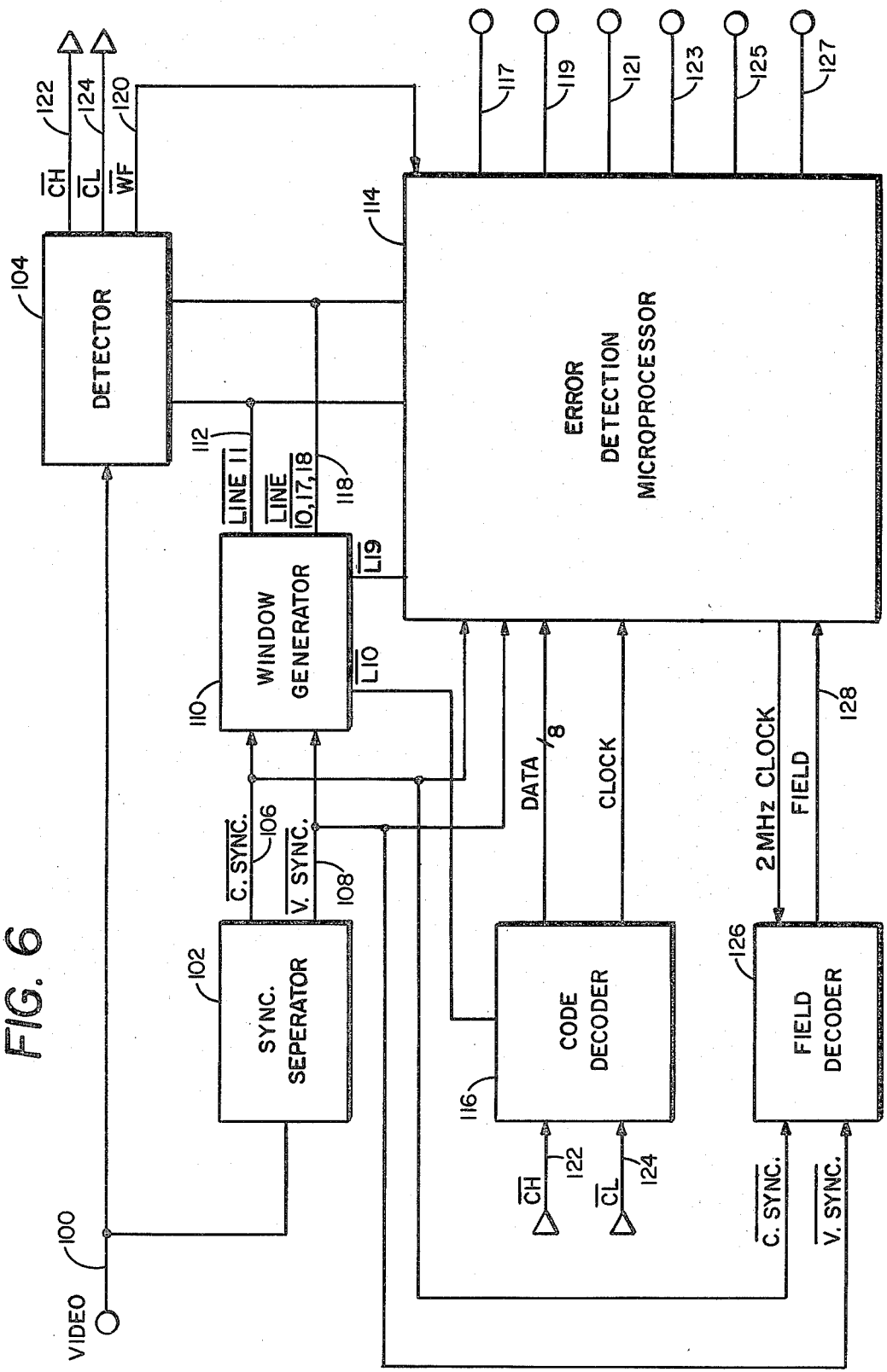
FIG. 6 is a block diagram of the preferred embodiment of the present invention.

Optical video discs come in two types, constant angular velocity, or CAV, discs and constant linear velocity, or CLV, discs. Optical video disc players also come in two types, a consumer type and an industrial type. Either type of disc may be played on either type of player, but different codes are used in the consumer player from those used in the industrial player in the implementation of the special playback modes such as stop motion playback and fast scan playback.

The technology for manufacture of CAV and CLV optical video discs and of consumer and industrial players is well known. Both kinds of video discs and consumer players are presently available in retail stores. Industrial players can be obtained from Discovision Associates, 3300 Hyland Ave., P.O. Box 6600, Costa Mesa, CA. 92626. Consumer players are distributed by Pioneer Video Corporation, 4880 Rosecrans, Hawthorne, Calif. 90250. The specific coding procedure described herein (the "MCA/Philips Code") is used in connection with the kind of optical video disc players available from those sources.

As mentioned above, the aforementioned reference codes are placed in the vertical blanking intervals of the video to be recorded on an optical video disc. FIGS. 1A and 1B are signal level diagrams of the vertical blanking intervals of Field 1 and Field 2 of video having inserted therein codes of the above-mentioned type.

As can be seen, the blanking interval of each field is divided into 20 sections, each having the duration of one horizontal line of video. In FIG. 1A, these intervals for Field 1 are identified by numbered segments 12, while in FIG. 1B these intervals are identified by numbered segments 14. The signal configuration and segment numbering is according to NTSC standard RS170A. This is the standard adopted in the United States for vertical blanking intervals.

It will be noted that special signals have been added to lines 10, 11, 17 and 18 of each vertical blanking interval. The signals which have been added correspond to a word 16 of FM encoded digital data, a "white flag" 18, and two words 20 and 22 of bi-phase encoded digital data.

FIG. 2 is a diagram showing line 11 of a vertical blanking interval having a "white flag" 18 inserted therein. The "white flag" 18 is a rectangular pulse having a level of 100 IRE, starting 10.169 microseconds of the leading edge of the horizontal sync pulse of the line in which it is inserted, and having a duration of 50.21 microseconds. For "program" video, that is, video having the primary picture content therein, which is to be placed on a CAV optical video disc, the "white flag" is inserted on line 11, and only on line 11, of those fields immediately following a complete "picture". A picture, in connection with film to video transfer, is a sequence of two or more fields corresponding to the same unchanging image. This is discussed in further detail below. The "white flag" is also inserted on line 11 of those fields immediately following a picture in CLV encoding.

The white flag is used by the industrial optical video disc players in the stop-motion mode. The white flag is detected during a vertical blanking interval and then a jump-back command is executed during that same vertical blanking interval.

FIG. 3 is a signal diagram of a word 16 of FM encoded digital data. The word 16 is comprised of forty bits of data, identified by numbered segments 24 which are shown above the bit cells of word 16 to aid in their identification. The value of such digital words is typically expressed in hex notation in the video art. The hex value of word 16 is shown above segments 24. Each bit cell has a duration of one microsecond. Thus, each word 16 has a duration of forty microseconds. The leading edge of the first bit cell in the word is placed 13.665 microseconds following the leading edge of the horizontal sync pulse of that line. "Zero" level is encoded as zero IRE, while "one" level is encoded as one hundred IRE.

FM encoding is a special form of binary digital encoding, known in the art, which is a "self-clocking" format. Transitions from a high to a low state or from a low to a high state are provided at the borders of every bit cell. Ones and zeros are distinguished by the presence or absence, respectively, of a transition in the middle of a bit cell.

It can be seen that the FM encoded word 16 in FIG. 3 has the hex notation value "CE4543210B". The general format of the FM encoded digital word 16 inserted in the vertical intervals of program video is "BX YYYYY 4ZC", in hex notation. The 5 digits, YYYYY represent the "FM Picture Number". The character X is a parity bit which is one if an even number of "1" bits appear in the FM picture number, or is zero if an odd number of "1" bits appear in the FM picture number. The character Z is a field identifier character having the value F when the word appears in field 1 and E when it appears in field 2. The other characters are sync constants. It will be noted that the FM data word 16 is recorded in reverse. Thus the FM Picture Number of word 16 in FIG. 3 is 12,345.

The FM picture number identifies the number of each picture in sequence, and is indexed between the first and second fields of each picture, such that the vertical blanking interval following each field in a given picture has the proper FM picture number encoded therein for that picture. This pattern of FM picture number placement is utilized in industrial optical video disc players in the search mode wherein the FM picture number is detected and compared with the number of the picture being searched to determine if identity exists.

FIG. 4 is a signal diagram of a word 20 of biphase data. The data word is in the format "FXXXXX", wherein XXXXX is a 5 digit number equal to the picture number plus 80000. The bi-phase data word signal 20 shown in FIG. 4 is encoded with the value F81234, which is the bi-phase data word associated with picture number 01234. Twenty-four bit cells are provided in each such bi-phase word, each bit cell lasting 2.00 microseconds. The entire word thus lasts forty-eight microseconds. The word starts twelve microseconds following the leading edge of the horizontal sync pulse for that line.

Bi-Phase data is also self clocking, and is encoded such that a level transition always occurs in the middle of a bit cell. A transition from a low level to a high level in the middle of a bit cell means that that bit cell has a value of "1", while a negative-going transition in the middle of a bit cell indicates a "0".

A bi-phase word signal is always inserted on both line 17 and line 18 preceding the first field of every picture. It is not applied to succeeding fields of the picture. This arrangement is utilized in consumer players in the stop motion mode. The bi-phase picture number is detected, one more field is played and then the player is caused to jump back and play the track just played again.

The aforementioned vertical interval codes may also appear in other kinds of video than program video. For example, program video recorded on optical video discs is always accompanied with a length of "Lead-in" video adjoining the start of the program video, and a length of "Lead-out" video following the end of the program video. Lead-in video and lead-out video may vary in length, but typically comprise several hundred frames of video which is usually unrelated to the program content in the program video.

The vertical interval encoding procedure currently being used in the MCA/Philips Code calls for the insertion of FM data signals, white flags, and bi-phase data signals in the vertical intervals of Lead-in video and Lead-out video. The embodiment of the present invention described below does not test the vertical interval codes placed in Lead-in video or Lead-out video, but only tests these signals as they appear in the program video. If desired, however, the apparatus can be modified to include a test sequence for such vertical interval code signals, as well as for other vertical interval code signals which may conform to other codes. Such modification is considered to be a routine matter for one skilled in the art once the principles of the present invention disclosed herein are understood.

FIG. 5 is a diagram which aids in understanding the relationship of pictures to video fields and frames. As mentioned above, a picture, in connection with film to video transfer, comprises a sequence of two or more fields of video which correspond to the same unchanging image. For example, each "frame" in a motion picture film comprises a single image. When transferring a motion picture film to a video format, account must be taken for the difference in the rates of repetition of film "frames" and video fields and frames. Motion picture film "frames" are presented at a rate of 24 "frames" per second, while video fields appear at a rate of 60 per second, video frames comprising two fields and thus appearing at a rate of 30 per second. This difference is accounted for in a process known as "3/2 pulldown" which results in a picture to field arrangement depicted in FIG. 5.

FIG. 6 is a block diagram of the preferred embodiment of the present invention. Video having the aforementioned vertical interval codes inserted therein, is applied to a signal line 100. The video on line 100 is applied to a conventional sync separator 102 and to a code detector 104. The sync separator separates the negative-going vertical and horizontal sync pulses from the composite video and applies the combined vertical and horizontal sync pulses ("$\overline{\text{C Sync}}$") to an output line 106.

The recovered vertical sync pulses ("$\overline{\text{V Sync}}$") are applied to line 108. Both $\overline{\text{C Sync}}$ and $\overline{\text{V Sync}}$ are applied to a window generator 110 which utilizes the sync pulses in connection with timing circuitry to generate negative-going pulses having a duration of one horizontal line, which occur during lines 10, 11, 17, 18 and 19 of the vertical interval. $\overline{\text{C Sync}}$ and $\overline{\text{V Sync}}$ are also applied to an error-detection-implementing microprocessor circuit 114. $\overline{\text{Line 10}}$ is applied to a decoder circuit 116, and is combined with $\overline{\text{line 17}}$, and $\overline{\text{line 18}}$ to form a composite signal which is applied to a signal line 118 connected to the detector 104 and the microprocessor circuit 114. $\overline{\text{Line 19}}$ is also applied to the microprocessor circuit 114.

The detector circuit 104 produces a negative-going pulse corresponding to the detected white flag, and this signal ("$\overline{\text{WF}}$") is applied to a signal line 120 connected to the microprocessor circuit 114. The detector 104 also produces as output pulses negative-going pulses corresponding to those portions of the detected FM and bi-phase data having a level greater than approximately 90% IRE ("$\overline{\text{CH}}$") and less than approximately 10 IRE ("$\overline{\text{CL}}$"). The $\overline{\text{CH}}$ signals are applied to a line 122, and the $\overline{\text{CL}}$ signals are applied to a line 124. Lines 122 and 124 are connected to the decoder circuit 116.

The $\overline{\text{C Sync}}$ and $\overline{\text{V Sync}}$ signals on lines 106 and 108, respectively, are also applied to a field decoder circuit 126. A two megahertz clock signal used in the microprocessor circuitry 114 is also applied to the field decoder 126. The output of the field decoder circuit 126 is a signal which identifies whether the current field of video is Field 1 or Field 2. This output signal is applied to a signal line 128 connected to the microprocessor circuitry 114.

In operation, the video on line 100 is applied to the sync separator 102 which generates the $\overline{\text{C Sync}}$ and $\overline{\text{V OVS /Sync/}}$ signals. These signals are used by the window generator 110 to generate the aforementioned vertical line window signals. Line 11 and the composite signal, line 10, 17, 18, are applied to the detector 104 which electronically examines the video on line 100 and produces the aforementioned $\overline{\text{CH}}$, $\overline{\text{CL}}$ and $\overline{\text{WF}}$ as outputs. $\overline{\text{WF}}$ is applied directly to the microprocessor circuitry, as mentioned above. Signals $\overline{\text{CH}}$ and $\overline{\text{CL}}$ are applied to the decoder circuit 116 which converts the signals into digital data in the conventional format, frequently referred to as NRZ data. The $\overline{\text{Comp Sync}}$ and $\overline{\text{V Sync}}$ signals are also used by the field decoder 126 to generate the aforementioned field signal which is also applied to the microprocessor circuitry 114.

The microprocessor circuit 114 is a conventional microprocessor circuit and is programmed, according to conventional techniques, to determine certain characteristics, described below, in the pattern of occurrance of the vertical interval codes which indicate whether the codes have been inserted correctly or erroneously according to the MCA/Philips Code. Output lines 117, 119, 121, 123, 125 and 127 are lines which provide output pulses upon the detection of an error or omission in the insertion of a code, and are described further below.

Figure 7:
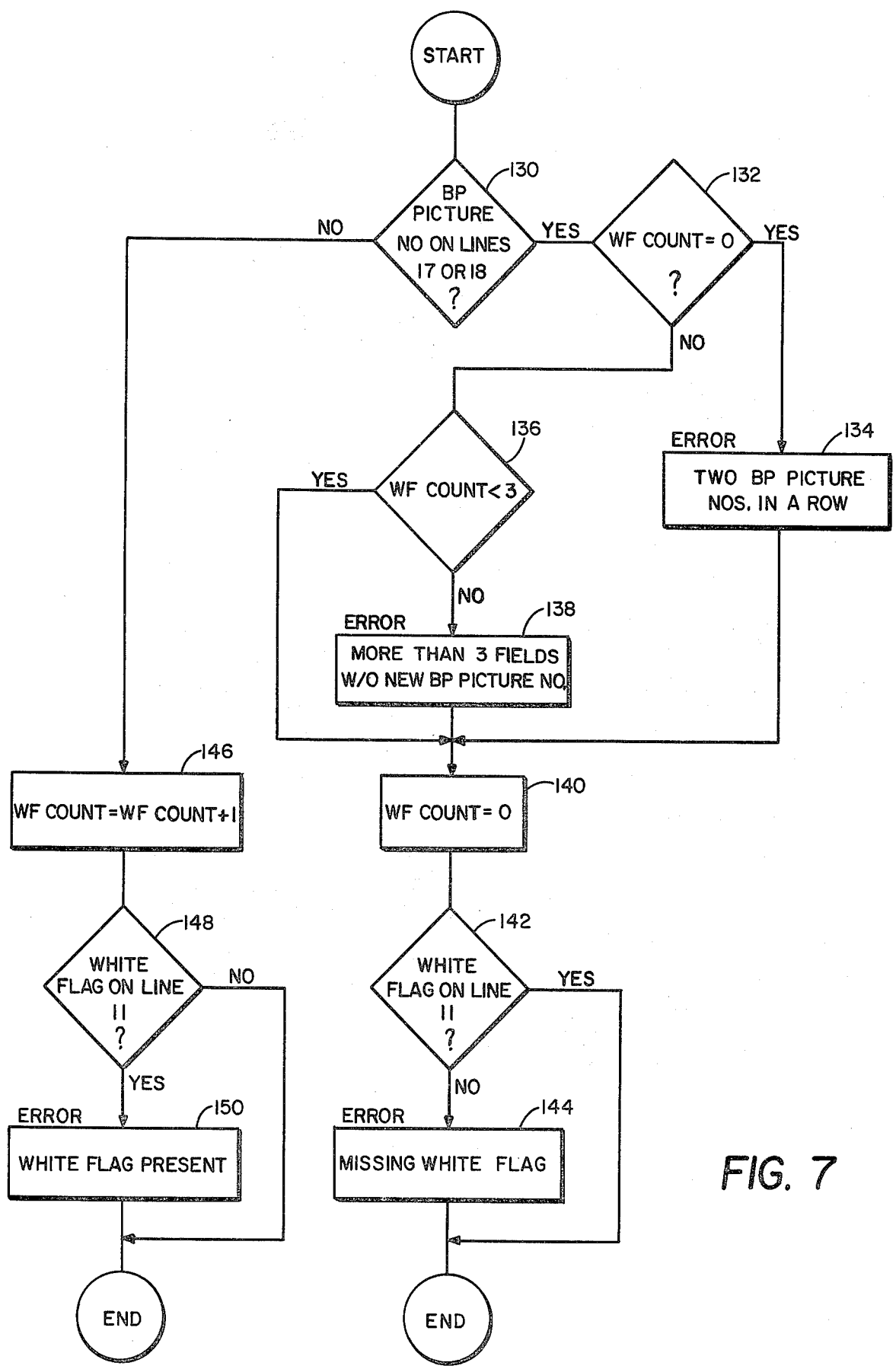
FIG. 7 is a flow chart of a microprocessor program utilized in the practice of the preferred embodiment of the present invention.

FIG. 7 is a flow-chart diagram of a routine implemented by microprocessor circuit 114 for examining CAV optical video disc program video having the aforementioned vertical interval code signals inserted therein to determine if the bi-phase data and the white flag signals have been inserted correctly therein. The routine depicted in FIG. 7 is implemented on each field of program video which is analyzed.

It should be noted that microprocessor routine represented by the flowchart in FIG. 7 is not simply a logical duplication of the MCA/Philips Code which controls the insertion of the code signals in the vertical interval of the video being examined. Rather, the routine is a streamlined set of steps which are based on assumptions, which provide the minimum information necessary to determine whether the video being inspected has properly inserted therein the vertical blanking interval code signals so that the aforementioned special playback modes can be implemented as desired. For example, the routine of FIG. 7 is based on the assumption that every time a biphase picture number is detected on line 17 or 18 a white flag should be on line 11. It will be recalled that according to the MCA/Philips Code, the white flag is inserted on line 11, and only on line 11, of those fields immediately following a complete picture. Under most pull-down schemes this field will be the first field of a complete picture. Since a biphase picture number signal is always applied on both line 17 and 18 of the first field of every picture, the aforementioned assumption is generally valid and provides a simplified basis for the routine represented in FIG. 7.

It will be noted that in the routine a counter called "WF Count" is cleared to zero every time a biphase picture number is detected on a field, and is otherwise incremented every field.

The first step in the routine is the execution of an inquiry step 130 to determine whether a picture number has been inserted on line 17 or 18. If the result of inquiry step 130 is affirmative, another inquiry step 132 is implemented to determine whether the WF Count is equal to 0. If the result of inquiry step 132 is affirmative, an error decision 134 is indicated by the output of a signal on line 117 (FIG. 6), namely, that two fields in a row have inserted therein biphase picture numbers. It will be recalled that biphase picture numbers are only applied on the first field of every picture, and are not applied to succeeding fields of the picture.

If the result of the inquiry step 132 is negative, a further inquiry step 136 is implemented to determine whether the WF Count is less than three. If it is not, an error decision 138 is indicated by the output of a signal on line 119 (FIG. 6), namely, that more than three fields have occurred in a row without a new picture number being inserted therein. In most conventional pulldown scemes no picture occupies more than three fields.

If the result of the inquiry step 136 is affirmative, the program proceeds to an execution step 140 to set the WF Count register to zero. This step is implemented in any of the branches proceeding from an affirmative result of inquiry step 130.

Following action step 140 another inquiry step 142 is implemented to determine whether a white flag exists on line 11. If the result of inquiry step 142 is negative, an error decision 144 is indicated by the output of a signal on line 121 (FIG. 6), namely, that a white flag is missing where it should appear. It will be recalled that every time a biphase picture number is detected on line 17 or 18 a white flag is assumed to belong on line 11. If the result of inquiry step 142 is affirmative, the routine proceeds to END. The routine also proceeds to END following step 144.

If the result of inquiry step 130 is negative, an action step 146 is executed to increment the WF Count counter by 1. Following action step 146 an inquiry step 148 is executed to determine if a white flag exists on line 11. If the result of inquiry step 148 is affirmative, an error decision 150 is indicated by the output of a signal on line 123 (FIG. 6), namely, that a white flag is present where it should not be, and the program procedes to END. White flags are only inserted on line 11 of the first field of a picture. The program also proceeds to END if the result of inquiry 148 is negative.

Figure 8A:
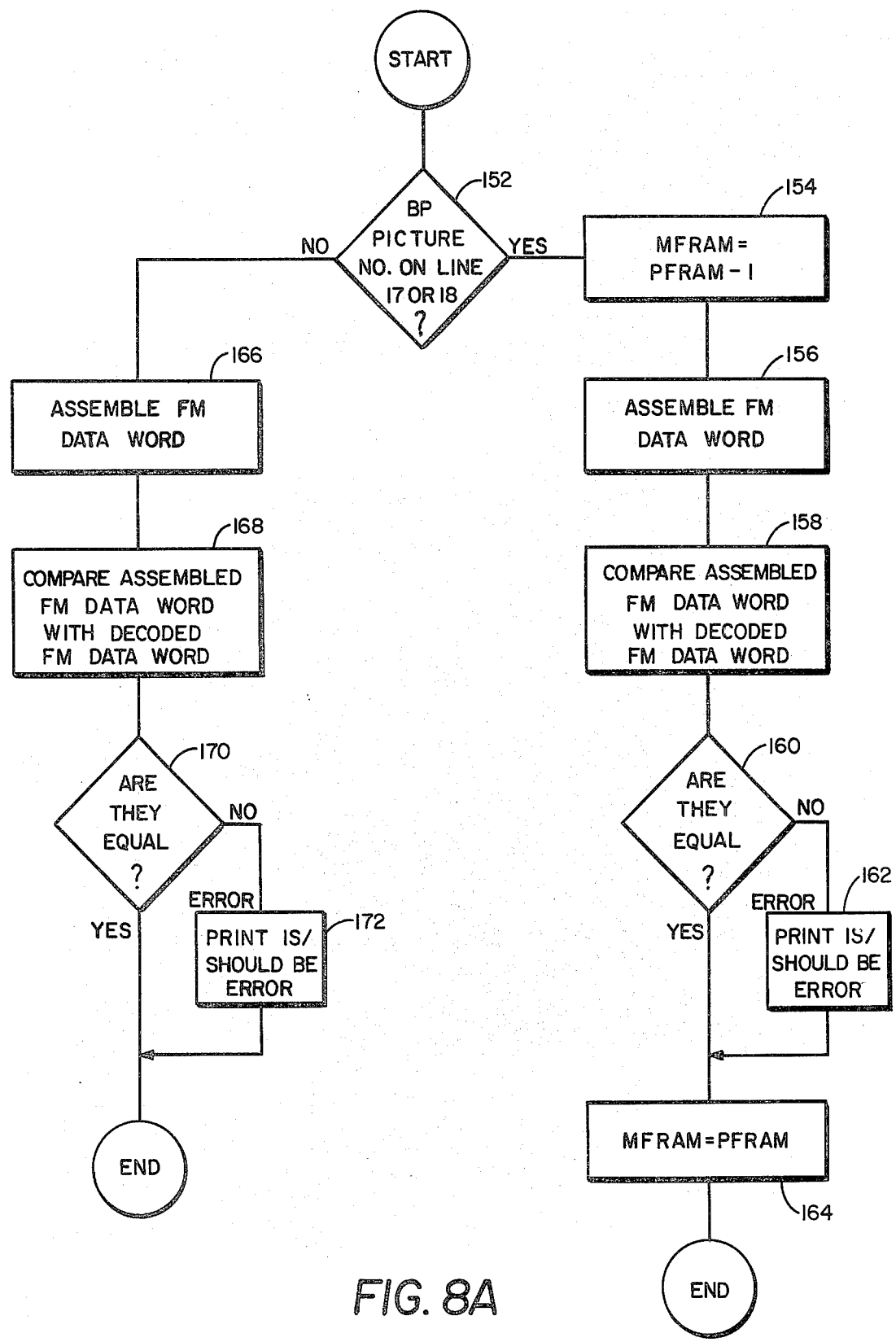
FIGS. 8A and 8B together form a flow chart of further microprocessor program utilized in the practice of the preferred embodiment of the present invention.
Figure 8B:
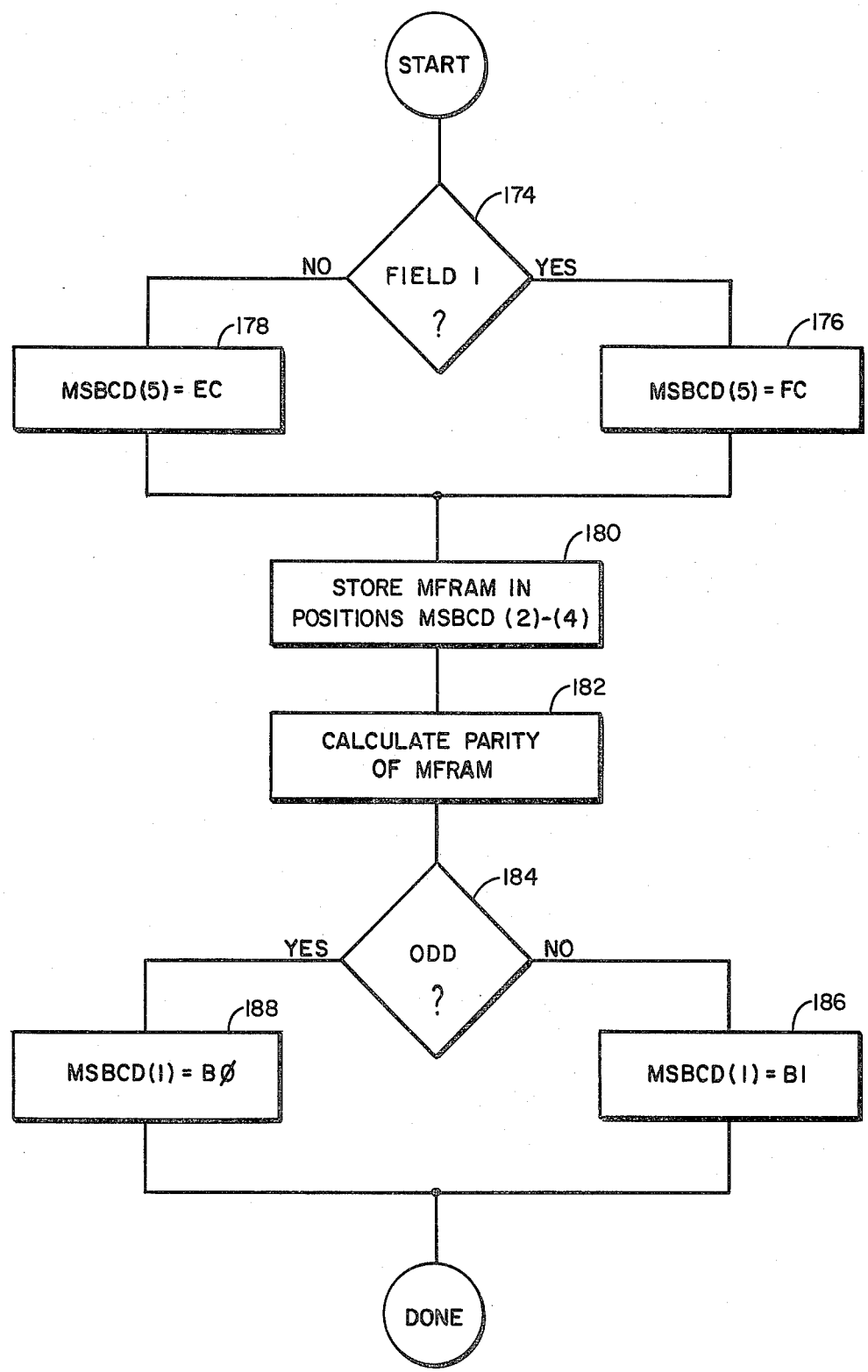

FIGS. 8A and 8B show a flow chart diagram of a routine implemented by the microprocessor circuit 114 for examining CAV optical video disc program video to determine if FM code signals have been properly inserted according to the MCA/ Philips Code. In the flow chart, the term PFRAM is used to describe the most recent biphase picture number read on lines 17 or 18. The term MFRAM is used to indicate what the current value of the FM picture number should be. It will be recalled that the FM data signal includes a picture number which is indexed between the first and second fields of each picture. The FM data signal is inserted on every field.

The routine depicted in FIG. 8A begins with an inquiry step 152 to determine whether a biphase picture number has been inserted on line 17 or 18. If the result of inquiry step 152 is affirmative MFRAM is set to equal PFRAM minus one, in an action step 154. After action step 154 is executed an assemble subroutine 156, shown in flow chart form in FIG. 8B, is implemented. In the assemble subroutine 156 the entire FM data word which should be found in that field is assembled.

Following the assemble subroutine 156 a comparison step 158 is implemented, in which the assembled FM data word is compared with the FM data word actually recovered from the segment of video being inspected. Following compare step 158 an execute step 160 is implemented to determine if the two data words compared in step 158 are equal. If the result of inquiry step 160 is negative, an error determination 162 is indicated by the output of a signal on line 125 (FIG. 6). Otherwise, the routine simply continues. In either case, the next step is an action step 164 in which MFRAM is set to be equal to PFRAM. The routine is then completed for that field.

If the result of inquiry step 152 is negative, the assemble subroutine 166 is implemented. The assembled data FM word is compared with the detected FM data word in a comparison step 168, and then an inquiry step 170 is implemented to determine if the comparison resulted in a determination that the two words are equal. If the result of inquiry step 170 is negative, an error decision 172 is indicated by the output of a signal on line 127 (FIG. 6), namely, that the FM data word is incorrect. The routine then procedes to END. If the result of inquiry step 170 is affirmative, no error is indicated and the routine procedes to END.

The assemble subroutine 156, 166 of FIG. 8A is shown in flow chart form in FIG. 8B. The assembled FM data word is indicated by the term MSBCD. The data word MSBCD is comprised of 5 separate bytes, numbered 1-5 and identified in parenthesis following the term MSBCD.

The subroutine begins with an inquiry step 174 to determine whether the current field being inspected is Field 1. If the result of inquiry step 174 is affirmative, data word MSBCD (5) is set equal to hex FC. If the result of inquiry step 174 is negative, MSBCD (5) is set equal to hex EC.

Following step 176 and 178, a storage step 180 is implemented, in which MFRAM is stored in storage byte locations MSBCD (2) through MSBCD (4). Following step 180 a parity calculation step 182 is implemented by which the parity of MFRAM is determined. Then an inquiry step 184 is implemented to determine whether the parity calculated in step 182 is odd. If the result of inquiry 184 is negative MSBCD (1) is set equal to hex B1, in an execution step 186.

If the result of inquiry 184 is affirmative, MSBCD (1) is set equal to hex B0, in an execution step 188. Following steps 186 and 188 the subroutine is complete.

The routines described above in connection with the flow charts shown in FIGS. 7, 8A and 8B, are readily convertable by one having ordinary skill in this art into programs useable by a conventional microprocessor circuit. Accordingly, the details of the implementation of such programming are not disclosed herein, as they would tend to obscure rather than clarify the present invention.

Figure 9:
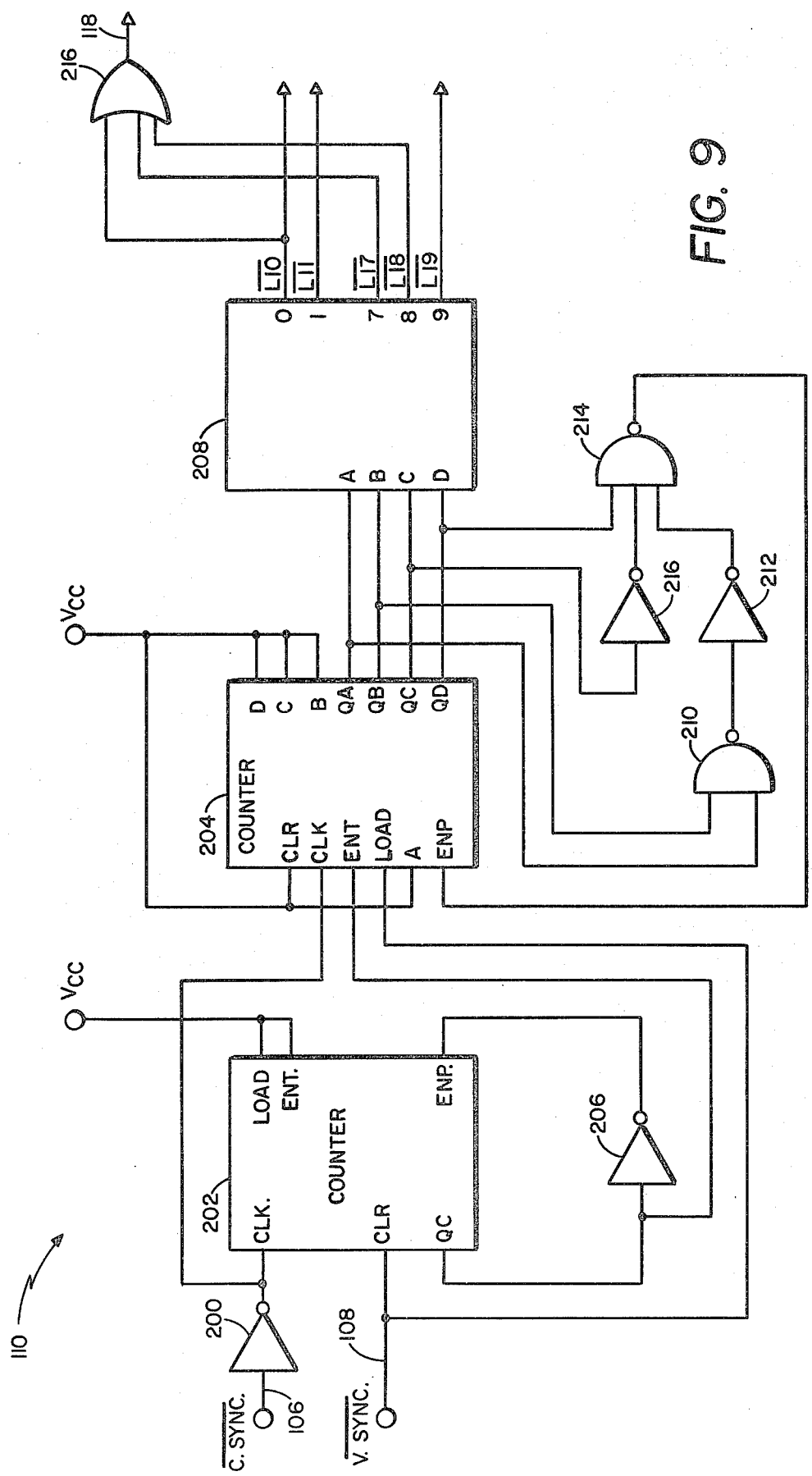
FIG. 9 is a circuit diagram of the window generator circuit shown in FIG. 6.

FIG. 9 is a diagram of the window generator circuit of FIG. 6. As shown, line 106, carrying the negative-going Comp Sync pulses ("$\overline{\text{C Sync}}$"), is applied to the input of an inverter 200. The output of inverter 200 is connected to the positive edge triggered clock inputs of two synchronous 4-bit counters. The Texas Instruments 74LS161 is a suitable integrated circuit counter which may be used for counters 202 and 204.

The negative-going $\overline{\text{Vsync}}$/ pulses on line 108 are applied to the CLEAR input of counter 202 and to the LOAD input of counter of 204. The $Q_C$ output of counter 202 is connected to the ENABLE T input of counter 204 and, through an inverter 206 to the ENABLE P input of counter 202. The CLEAR input, and A, B, C and D inputs of counter 204 are connected to $V_{CC}$. Outputs $Q_A$-$Q_D$ of counter 204 are connected to the A-D inputs of a 4-line-to-10-line decoder 208. Decoder 208 can be, for example, a Texas Instruments 74LS42 integrated circuit device. The $Q_A$ and $Q_B$ outputs of counter 204 are connected to the two inputs of a NAND gate 210. The output of NAND gate 210 is connected to the input of an inverter 212, the output of which is connected to one input of a three input NAND gate 214. The $Q_C$ output of counter 204 is connected to the input of an inverter 216, the output of which is connected to a second input of inverting and gate 214.

The $Q_D$ output of counter 204 is connected to the third input of NAND gate 214. The output of NAND gate 214 is connected to the ENABLE P input of counter 204. The 0, 1, 6, 8 and 9 outputs of decoder 208 comprise lines $\overline{L10}$, $\overline{L11}$, $\overline{L17}$, $\overline{L18}$ and $\overline{L19}$, respectively. Lines $\overline{L10}$, $\overline{L17}$, and $\overline{L18}$ are combined as inputs to AND gate 216, the output of which comprises line 118.

The timing scheme implemented by the window generator circuit shown in FIG. 9 assumes that sync seperator circuit 102 (FIG. 6) produces a vertical sync pulse having a trailing edge occurring between the second and third negative-going short serration pulses following the vertical sync pulse interval in the video signal. Referring to FIGS. 1A and 1B, it can be seen that the trailing edge of the $\overline{\text{V Sync}}$ pulse occurs at point "X" in Field 1 and at point "Y" in Field 2. The timing of the leading edge of the generated $\overline{\text{V Sync}}$ pulse is not critical to the window generator circuit shown in FIG. 9, but it is recommended that the leading edge of the generated V sync pulse be set to occur approximately in the middle of the second long negative-going pulse in the vertical sync interval of each field. This corresponds to point X' in FIG. 1A and point Y', in FIG. 1B.

Returning now to FIG. 9, the circuit operates as follows. The CLEAR inputs of counters 202 and 204 are low state active. Thus, during the negative-going $\overline{\text{V Sync}}$ pulse on line 108 the counter remains in a cleared state. After the occurrence of the trailing edge of the $\overline{\text{V Sync}}$ pulse, counter 202 begins to clock in response to positive edges applied to the CLOCK input thereof. Four CLOCK counts later, the $Q_C$ output of counter 202 goes high, thus enabling counter 204 and, through inverter 206, disabling counter 202. Counter 204 was previously loaded, during the $\overline{\text{V Sync}}$ pulse, with the value "1111". The first clock pulse received after counter 204 is enabled, which in every case will be the horizontal sync pulse at the beginning of line 10 of the vertical blanking interval, causes counter 204 to "turn-over" and count to 0. The counter 204 continues to count horizontal sync pulses during the remainder of the vertical blanking interval, and the $Q_A$-$Q_D$ outputs of counter 204 provide the binary value of this count to decoder 208. Decoder 208, in turn, produces at its 0 through 9 outputs pulses corresponding to lines 10 through 19, all of which are negative-going pulses.

The arrangement of AND gates 210 and 214 and invertors 212 and 216 serve to disable counter 204 upon the detection of the sync pulse following line 20 of the vertical blanking interval.

The $\overline{L10}$, $\overline{L17}$ and $\overline{L18}$ outputs of counter 208 are combined in AND gate 218 to form line 118.

Figure 10:
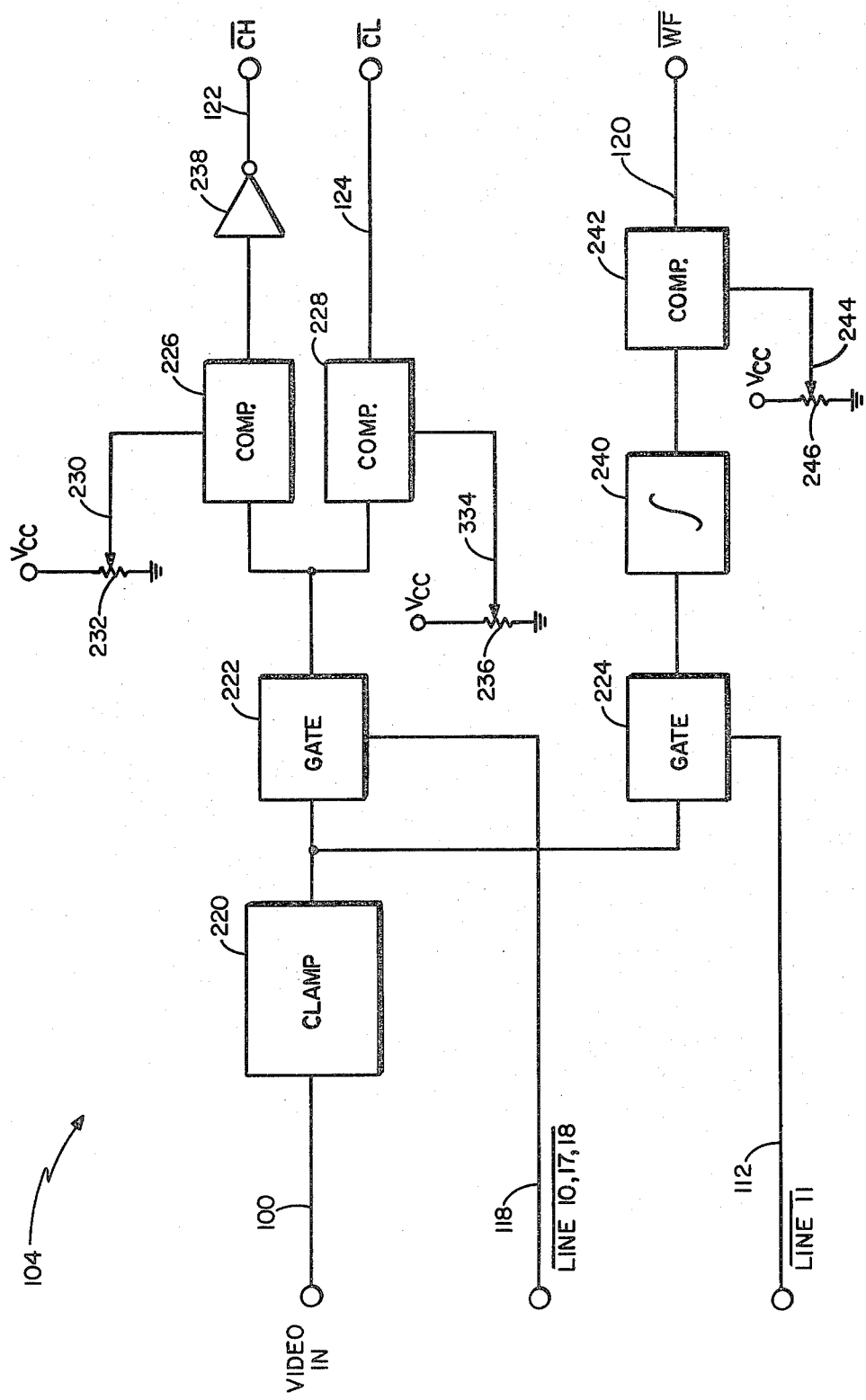
FIG. 10 is a circuit diagram of the detector circuit shown in FIG. 6.

FIG. 10 is a block diagram of the detector circuit 104 shown in FIG. 6. In circuit 104 the video on line 100 is applied to the input of a conventional clamping circuit 220 which clamps the reference blanking level portion of the video input signal to a standard reference voltage value. The clamped video output from clamping circuit 220 is applied to the inputs of conventional gates 222 and 224.

Signal line 118, carrying $\overline{\text{Line 10, 17, 18}}$, is applied to the control input of gates 222, while line 112, carrying line 11, is applied to the control input of gate 224. The output of gate 222 is applied to one input of each of two comparators 226 and 228. The other input to comparator 226 is connected to the wiper arm 230 of a potentiometer 232 connected between $V_{CC}$ and ground. The other input of comparator 228 is connected to the wiper arm 234 of a second potentiometer 236 connected between $V_{CC}$ and ground.

The output of comparator 226 is connected to the input of an inverter 238, the output of which comprises signal $\overline{CH}$. The output of comparator 228 comprises signal $\overline{CL}$. The output of gate 224 is connected to the input of a conventional integrator circuit 240, the output of which is connected to one input of a further comparator 242. The other input of comparator 242 is connected to the wiper arm 244 of a further potentiometer 246 connected between $V_{CC}$ and ground. The output of comparator 242 comprises signal $\overline{WF}$.

In operation, the clamped video signals are gated through gate 222 during those line intervals in which data is expected to occur. The wiper arm of potentiometer 232 is set to provide a voltage to cause the comparator 232 to output a high level signal only when the data pulses applied to the input thereof, rise above a predetermined value, which may be set to be 90% of 100 IRE, for example. This high level output is inverted by inverter 238. Likewise, the wiper arm 234 of potentiometer 236 is set so as to produce a low level output only when the data signals fall below a predetermined voltage, which may be set to be 10% IRE, for example. This circuit arrangement permits a check to be made on the quality of the data recorded on lines 10, 17 and 18. If the data signals fail to exceed the minimum limit set by the potentiometers 232 and 236, an error signal will be generated by the embodiment of the present invention described herein. This error signal indicates the necessity for an inspection of the data signal, by which the nature of the signal deficiency can be determined.

The clamped video is gated through gate 224 during line 11 and is applied to integrator 240. It will be recalled the white flag signal applied to line 11 is a 50 microsecond signal having an amplitude of 100 IRE. The wiper arm of potentiometer 246 is set in conjunction with the time constant of integrator 240 to ensure that comparator 242 will have a positive level output only if a 100 IRE level signal is applied to the input of integrator 240 for a duration greater than some predetermined time related to the duration of the white flag signal, for example, 80% of that duration, or 40 microseconds. The output of comparator 242 is the desired WF signal.

Figure 11:
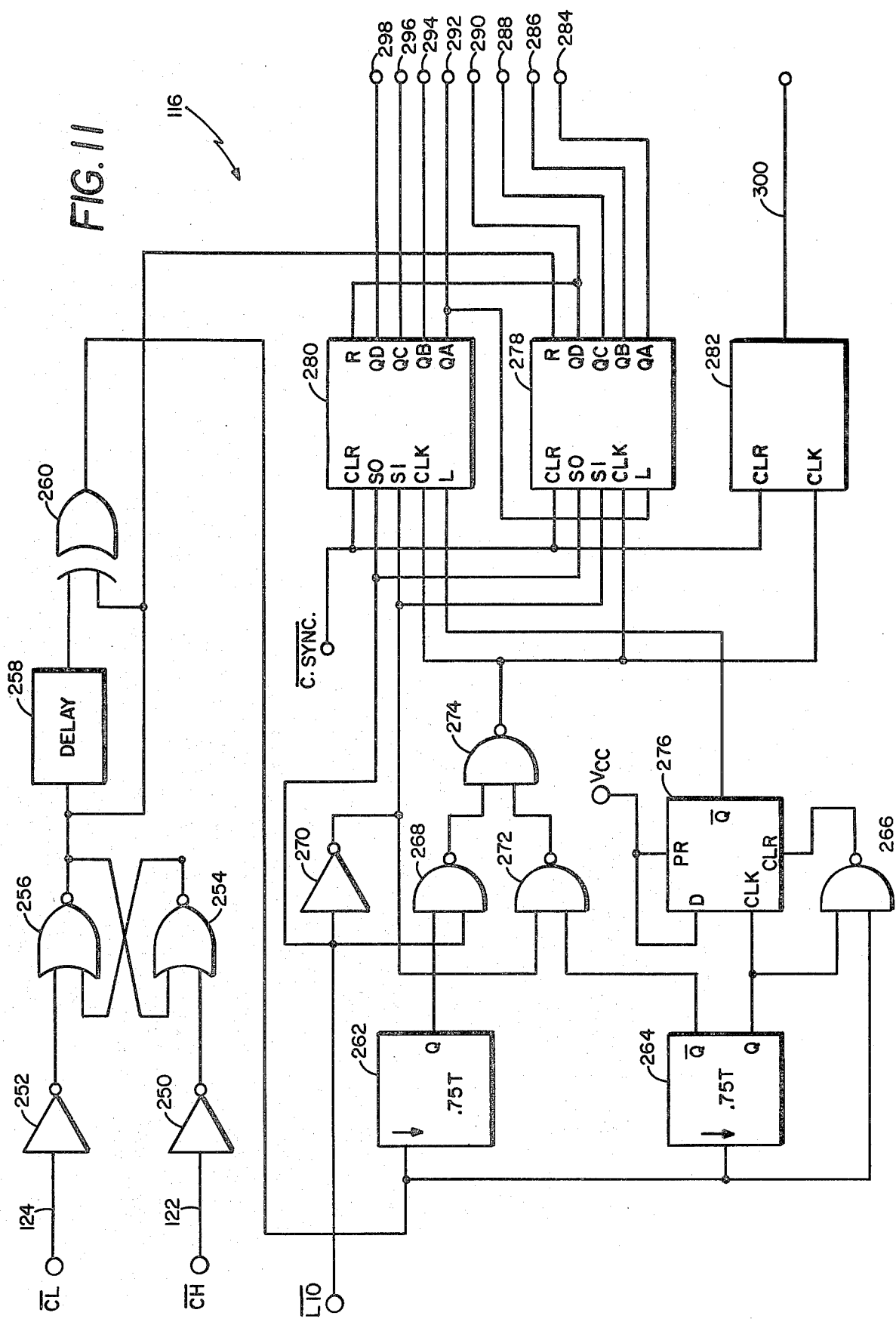
FIG. 11 is a circuit diagram of the decoder circuit shown in FIG. 6.

FIG. 11 is a schematic diagram of the decoder circuit shown in FIG. 6. Signal lines 122 and 124, carrying the $\overline{CH}$ and $\overline{CL}$ signals respectively, are each applied to one of two inverters 250 and 252, respectively. The outputs of inverters 250 and 252 are applied to the inputs of a pair of NOR gates 254 and 256 connected in a latch configuration. The output of NOR gate 256 is thus the recovered data signal pulses. The output of NOR gate 256 is applied to the input of a 100 nanosecond delay circuit 258 and to one input of an exclusive OR gate 260. It is also applied to the R input of a shift register 278. The output of delay circuit 258 is applied to the other input of exclusive OR gate 260. The combination of the delay circuit 258 and exclusive OR gate 260 comprise an edge detector, such that the output of exclusive OR gate 260 comprises a series of high level pulses having a duration substantially equal to the duration of delay circuit 258, namely, 100 nanoseconds, which are generated by every edge of the pulses outputted from NOR gate 256.

The output of exclusive OR gate 260 is applied to the negative edge trigger input of each of two one shots 262 and 264. One shot 262 is set to produce a pulse output having a duration substantially equal to 0.75 times the duration of a bit cell of bi-phase data. The duration of one shot 264 is set to be substantially equal to 0.75 times the duration of a bit cell of FM data. The output of NOR gate 260 is also applied to one input of a NAND gate 266. The Q output of one shot 262 is applied to one input of another NAND gate 268. The $\overline{L10}$ signal from the window generator circuit 110 (FIG. 6) is applied to the other input of NAND gate 268 and to the input of an inverter 270, the output of which is connected to one input of a further NAND gate 272, and to the S1 inputs of shift registers 278 and 280. $\overline{L10}$ is also applied to the S0 inputs of shift registers 278 and 280. The $\overline{Q}$ output of one shot 264 is connected to the other input of NAND gate 272.

The output of NAND gates 268 and 272 are applied to the two inputs of a further inverting AND gate 274, the output of which comprises the recovered bi-phase data and is applied to the CLOCK inputs of shift registers 278 and 280, and to the CLOCK input of a counter 282 which is selected to count cyclically from 0 to 7. Shift registers 278 and 280 can each be Texas Instruments 74LS194 integrated circuit devices.

The Q output of one shot 264 is applied to the other input of NAND gate 266 and to the CLOCK input of a D-type flip flop 276. The output of NAND gate 266 is applied to the CLEAR input of flip flop 276. The D input and the PR inputs of flip flop 276 are connected to $V_{CC}$. The $\overline{Q}$ output of flip flop 276 comprises the recovered FM data in NRZ format. It is connected to the L input of shift register 280.

$\overline{C\,Sync}$ is applied to the CLEAR inputs of shift registers 278 and 280, and to the CLEAR input of counter 282.

The $Q_D$ output of shift register 278 is connected to the R input of shift register 280. The $Q_A$–$Q_D$ outputs 284–290 of register 278 and the $Q_A$–$Q_D$ outputs 292–298 of shift register 280 comprise the data output of the data decoder circuit. The output 300 of counter 282 provides the clock pulse for the reading of the data on lines 284–298.

In operation, the data detector circuit shown in FIG. 11 operates as follows. When FM data is to be recovered during line 10 of the vertical blanking interval, line $\overline{L10}$ is low, thus blocking the output of one-shot 262 through the action of NAND gate 268. This also enables NAND gate 272 to pass the $\overline{Q}$ output of one shot 264 to NAND gate 274. One-shot 264 is set to a time duration approximately equal to 0.75 times the duration of a single FM bit cell. FM bit cells have a nominal duration of 1.0 microseconds, and therefore one-shot 264 will usually be set to 0.75 microseconds.

The first edge of FM data will always occur at the initial edge of the first bit cell of that data in the MCA/Philips Code. This will always under normal circumstances, give rise to a pulse output from exclusive OR gate 260, which is applied to the falling edge triggered input of one shot 264. Thereafter, exclusive OR gate 260 will always produce a pulse output corresponding to a transition from one bit cell to another. There will also be transitions in the middle of those bit cells, but due to the time value of one shot 264 those center-occurring transitions are never operated on by the one shot 264. Thus, the n$\overline{Q}$ output of one shot 264 comprises a recovered clock pulse from that incoming data. This recovered clock is applied to the CLOCK input of shift registers 278 and 280, and to the CLOCK input of counter 282.

The Q output of one shot 264 is applied to the CLOCK input of flip flop 276. However, in the absence of a high level signal at the output of exclusive OR gate 260, the output of NAND gate 266 remains high, thus forcing flip flop 276 to remain in a cleared state. Only during those bit cells in which a pulse appears at the output of exclusive OR gate 260, corresponding to those bit cells having a transition in the middle thereof, will flip flop 276 be able to be clocked, thus allowing the Q output thereof to go from a low state to a high state. In this way the FM data is recovered.

In the recovery of bi-phase data, NAND gate 268 is enabled and NAND gate 272 is disabled. Also, due to the structure of bi-phase data, and the format of the MCA/Philips Code, the first edge detected by one shot 262 always occurs in the middle of the first bit cell. Thereafter, due to the nature of bi-phase data, an edge will always occur in the middle of a bit cell. Thus, the recovered clock appearing at the output of one-shot 262 is always triggered at the middle of the bi-phase data bit cells. It will be recalled that a bi-phase data "0" is characterized by a negative-going transition in the middle of a bit cell and a bit value of "1" is characterized by a positive-going transition in the middle of a bit cell. Thus, the "last half" of a bit cell in bi-phase data format gives the bit value of that bit cell. Due to the delay built in to the clock recovery system, the rising edge of the clock pulse appearing at the clock inputs of shift registers 278 and 280 will be slightly delayed from the middle of the bit cell, time referenced to the output of inverting OR gate 256. The value appearing at the R input of shift register 278 upon the occurrence of the leading edge of a clock pulse during the recovery of bi-phase data will, therefore, always correspond to the correct value of data for that bit cell.

The two shift registers 278 and 280 are connected in series and every 8 bits a clock pulse appears on line 300, thus allowing the recovery of the data 8 bits at a time. It will be noted that FM data is clocked in from "left to right", while bi-phase data is clocked in from "right to left". It will be recalled that FM data and bi-phase data are reversed in the time sequence in which they appear, and therefore this arrangement ensures that the data which is outputted on lines 284–298 is always readable in the same direction.

Figure 12:
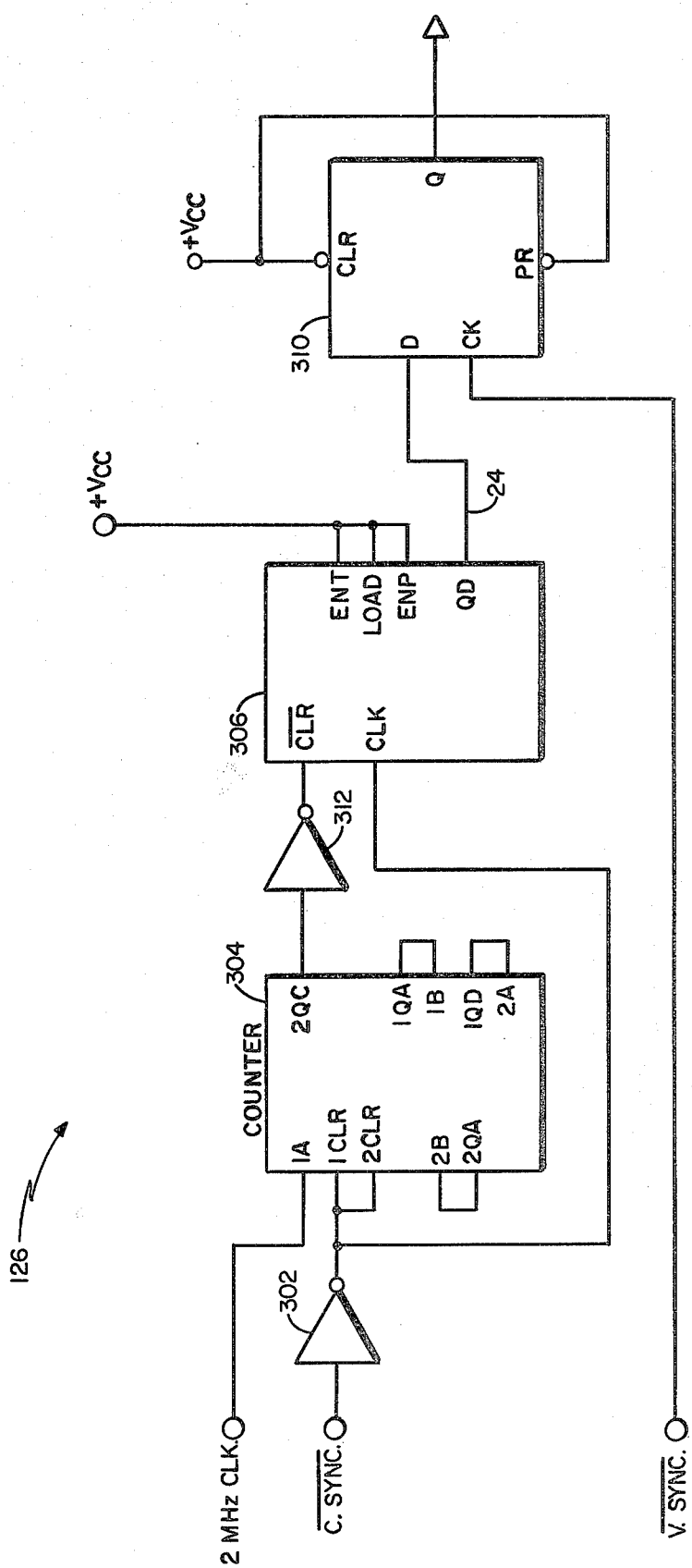
FIG. 12 is a circuit diagram of the field decoder circuit shown in FIG. 6.

FIG. 12 is a schematic diagram of the field decoder circuit 126 shown in FIG. 5. $\overline{C}$ Sync is applied to an inverter 302, the output of which is applied to the 1 CLEAR and 2 CLEAR inputs of a dual 4-bit decade and binary counter 304, and to the CLOCK input of a second dual 4-bit decade and binary counter 306. Counters 304 and 306 can be, for example, Texas Instruments 74LS390 integrated circuit devices. A two megahertz clock, which may be derived from the microprocessor circuit 114 (FIG. 5), if that circuit utilizes a 2 megahertz clock, is applied to the 1A input of counter 304. If a two megahertz clock is otherwise unavailable, a separate clock circuit must be provided.

$\overline{V}$ Sync pulses are applied to the input of an inverter 308, the output of which is applied to the CLOCK input of a type D flip flop 310. The 2B and $2Q_A$ terminals of counter 304 are connected together, as are the $1Q_A$ and 1B terminals, and the $1Q_D$ and 2A terminals thereof. The $2Q_C$ output of counter 304 is connected to an inverter 312, the output of which is applied to the $\overline{CLEAR}$ input of counter 306. The ENP, ENT and LOAD terminals of counter 306 are connected to $V_{CC}$. The $Q_D$ output of counter 306 is connected to the D input of flip flop 310. The inverting PR terminal of flip flop of 310 are connected to $V_{CC}$. The $Q_D$ output of flip flop 310 is the field indicator output of the circuit.

The circuit in FIG. 12 operates as follows. The repetative $\overline{Sync}$ signals which, in the absence of serration, recur cyclicly at intervals of approximately 63.5 microseconds, clear counter 304. Counter 304 counts at the 2 megahertz clock rate from 0 every such cycle. Due to the interconnections of the counter 304, every $2^7$ counts, the $2Q_C$ output of counter 304 goes high. This occurs every 32 microseconds. This results in counter 306 being cleared every horizontal line.

When equalizing pulses appear, however, the counter 304 is cleared before the $2Q_C$ output thereof can go high, and thus counter 306 is no longer cleared, but is rather allowed to count the edges of the equalizing pulses. After $2^4$ counts of equalizing pulses the $Q_D$ output of counter 306 goes high, thereby allowing flip flop 310 to be set if the CLOCK input thereof is at a high level. Because of the relative timing of equalizing pulses with respect to the recovered $\overline{V}$ Sync pulse, flip flop 310 will only be set during field 2. In this way the circuit indicates field.

Although the invention has been described in detail with respect to its presently preferred embodiment, it would be understood by one of ordinary skill in the art that various modifications can be made without departing from the scope of the invention. For example, as mentioned above, other microprocessor circuit routines can be devised to test vertical interval code signals inserted in video according to other Codes than the MCA/Philips Code. In addition, modifications to the routines presented herein, can also be made to examine other aspects of the code signals inserted according to the MCA/Philips Code. Accordingly, it is not intended that the invention be limited except as by the appended claims.

I claim:

1. Apparatus for verifying the presence of and proper placement of a plurality of code signals placed in the vertical blanking intervals of a segment of composite video information according to a predetermined procedure and pattern for code signal insertion, comprising:
   code detector means for recovering said code signals from said composite video information;
   sampling means for sampling the recovered code signals at discrete locations; and
   test means for comparing the sampling at a first one of said discrete locations with a subsequent sampling at a second one of said discrete locations, and including indicating means for generating an error signal representative of the detection of a discrepency between the characteristics of the relationship between the said first and second samplings and corresponding predicted characteristics according to said predetermined pattern.

2. Apparatus according to claim 1, wherein said code detector means comprises:
   window signal means for generating a window indicating signal during those predetermined portions of said vertical blanking intervals in which said code signals should occur according to said predetermined procedure and pattern; and
   wherein said code detector means comprises decoder means responsive to said window signal means for operating on said segment of video to recover said code signals as digital data from said discrete locations of said vertical blanking intervals during which said signals should occur.

3. Apparatus according to claim 2 wherein said apparatus further comprises sync pulse separator means for recovering video horizontal and vertical sync pulses from said segment of video and providing said pulses as outputs, and wherein said discrete locations of said vertical blanking intervals comprise horizontal line intervals therein, and wherein said window signal generator means comprises:
reference signal means responsive to said vertical and horizontal sync pulses for generating a predetermined time referenced signal within each vertical blanking interval;
counter means responsive to said reference signal means and to said sync pulse separator means for counting horizontal line intervals occurring in said vertical blanking interval after said predetermined time referenced signal; and
means responsive to said counter means for generating sampled output signals during selected horizontal line intervals during said vertical blanking interval.

4. Apparatus according to claim 1, wherein said code signals comprise a plurality of biphase coded digital data words corresponding to the number in sequence of a selective group of video fields of said video segment, and wherein said code detector means further comprises means for converting said biphase digital data words into NRZ digital data words.

5. Apparatus according to claim 1, wherein said code signals comprise a plurality of FM encoded digital data words corresponding to the number in sequencd of a selective group of video fields of said video segment, and wherein said code detector means further comprises means for converting said FM digital data words into NRZ digital data words.

6. The apparatus as claimed in claim 1, wherein:
said video segment is subdivided into selective groups of video fields, and said plurality of code signals includes a first vertical interval code at said first discrete location within the vertical blanking interval preceding the first field of each said group, and a second vertical interval code at said second discrete location within the vertical code interval of each field of each said group; and
said indicating means includes means for generating an error signal when said first vertical interval code is detected in two consecutive fields identified by the presence of two consecutive ones of said second vertical interval codes.

7. The apparatus as claimed in claim 1, wherein:
said video segment is subdivided into selective groups of video fields, and said plurality of code signals includes a first vertical interval code at said first discrete location within the vertical blanking interval preceding the first field of each said group and changed in its code at each occurrence thereof, and a second vertical interval code at said second discrete location within the vertical blanking interval of each field of each said group; and
said indicating means includes means for generating an error signal when more than three consecutive second vertical interval codes are detected without a change in the code of said first vertical interval code.

8. The apparatus as claimed in claim 1, wherein:
said video segment is subdivided into selective groups of video fields, and said plurality of code signals includes a first vertical interval code at said first discrete location within the vertical blanking interval preceding the first field of each said group, and a second vertical interval code at said second discrete location within the vertical blanking interval of each field immediately following each said group; and
said indicating means includes means for generating an error signal when, in the same vertical interval, said first vertical interval code is present without a second vertical interval code.

9. The apparatus as claimed in claim 1, wherein:
said video segment is subdivided into selective groups of video fields, and said plurality of code signals includes a first vertical interval code at said first discrete location within the vertical blanking interval preceding the first field of each said group, and a second vertical interval code at said second discrete location within the vertical blanking interval of each field immediately following each said group; and
said indicating means includes means for generating an error signal when, in the same vertical interval, said second vertical interval code is detected without the presence of a first vertical interval code.

10. The apparatus as claimed in claim 1, wherein:
said video segment is subdivided into selective groups of video fields, and said plurality of code signals includes a first group-identification code at said first discrete location within the vertical blanking interval preceding the first field of each said group, and a second group-identification code at said second discrete location within the vertical blanking interval preceding each field of each said group; and
said test means includes a code comparator for comparing said second group-identification code with said first group-identification code; and
said indicating means includes means for generating an error signal when said code comparator means indicates that the two group-identification codes do not identify the same group.

11. The apparatus as claimed in claim 10, wherein:
said first group-identification code is incremented at each occurrence thereof;
said second group-identification code is incremented between the first and second fields of each said group;
said test means includes means for decrementing the recovered first group-identification code, and means for determining and indicating when said first and second group-identification codes occur within the same vertical interval; and
said code comparator means compares said second group-identification code with said first group-identification code decremented by a count of one when said first and second group-identification codes are determined to be within the same vertical interval, and compares said second group-identification code with said first group-identification code non-decremented when said first and second group-identification codes are determined not to be within the same vertical interval.

12. The apparatus as claimed in claim 6, wherein said selective groups of video fields comprise alternate groups of two and three fields according to standard three-two pulldown procedures.

13. The apparatus as claimed in claim 6, wherein said selective groups of video fields comprise consecutive groups of two fields per group.

* * * * *